US008799378B2

(12) United States Patent
Chu et al.

(10) Patent No.: US 8,799,378 B2
(45) Date of Patent: Aug. 5, 2014

(54) NON-GREEDY CONSUMPTION BY EXECUTION BLOCKS IN DATAFLOW NETWORKS

(75) Inventors: Michael L. Chu, Bellevue, WA (US); Daniela Cristina Manu, Sammamish, WA (US); Stephen H. Toub, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 378 days.

(21) Appl. No.: 12/972,050

(22) Filed: Dec. 17, 2010

(65) Prior Publication Data

US 2012/0158840 A1    Jun. 21, 2012

(51) Int. Cl.
| | | |
|---|---|---|
| G06F 15/16 | (2006.01) | |
| G06F 13/00 | (2006.01) | |
| H04L 29/06 | (2006.01) | |
| H04L 29/08 | (2006.01) | |
| H04L 29/12 | (2006.01) | |
| H04L 12/58 | (2006.01) | |

(52) U.S. Cl.
CPC .......... *H04L 29/06* (2013.01); *H04L 29/06027* (2013.01); *H04L 51/30* (2013.01); *H04L 65/1006* (2013.01); *H04L 65/1009* (2013.01); *H04L 65/1069* (2013.01); *H04L 65/608* (2013.01); *H04L 67/142* (2013.01); *H04L 69/18* (2013.01); *H04L 69/24* (2013.01); *H04L 69/26* (2013.01)
USPC .......... 709/206; 709/201; 709/202; 709/203; 709/204; 709/205; 709/207; 709/230; 709/231; 709/232; 709/234; 709/238; 709/245; 709/246; 709/247; 709/248; 709/219; 709/220; 709/225; 709/227

(58) Field of Classification Search
CPC ....................................................... H04L 29/06
USPC ......... 709/203–206, 201, 202, 207, 230, 231, 709/232, 234, 238, 245, 246, 247, 248
See application file for complete search history.

(56) References Cited

U.S. PATENT DOCUMENTS 6,151,696 A * 11/2000 Miller et al. .................. 714/748
7,111,074 B2   9/2006 Basturk
(Continued)

FOREIGN PATENT DOCUMENTS

| CN | 1933449 A | 3/2007 |
|---|---|---|
| CN | 101371484 A | 2/2009 |
| CN | 101448014 A | 6/2009 |

OTHER PUBLICATIONS

Chu et al., "Actor-Based Programming with the Asynchronous Agents Library," MSDN Magazine, Sep. 2010, http://msdn.microsoft.com/en-us/magazine/ff959205.aspx.

(Continued)

*Primary Examiner* — Saket K Daftuar
(74) *Attorney, Agent, or Firm* — Kevin Sullivan; Alin Corie; Micky Minhas

(57) ABSTRACT

Processing messages in dataflow networks. The method includes, at a first entity, receiving from a second entity a first offer of a first message to process. The method further includes determining to not process the first message. As a result of determining to not process the first message, such an indication is made to the second entity. Further as a result of determining to not process the first message, an indication is stored that the second entity offered a message. The indication includes an indicator correlated to the second entity. Subsequent to indicating to the second entity, using the indication the method includes indicating to the second entity availability to process a message.

21 Claims, 2 Drawing Sheets

(56) References Cited

U.S. PATENT DOCUMENTS

| | | | |
|---|---|---|---|
| 7,436,769 B2 | 10/2008 | Loader | |
| 7,519,674 B2* | 4/2009 | Regnier | 709/206 |
| 7,680,877 B2* | 3/2010 | Regnier et al. | 709/202 |
| 7,817,649 B2* | 10/2010 | Kim et al. | 370/410 |
| 8,019,877 B2* | 9/2011 | Li et al. | 709/227 |
| 8,159,961 B1* | 4/2012 | Rai et al. | 370/252 |
| 2003/0041096 A1* | 2/2003 | Johnson | 709/201 |
| 2003/0055727 A1* | 3/2003 | Walker et al. | 705/14 |
| 2004/0205377 A1* | 10/2004 | Nakamura et al. | 714/4 |
| 2005/0027867 A1* | 2/2005 | Mueller et al. | 709/227 |
| 2005/0144312 A1* | 6/2005 | Kadyk et al. | 709/237 |
| 2005/0262205 A1* | 11/2005 | Nikolov et al. | 709/206 |
| 2006/0018323 A1* | 1/2006 | Kempe | 370/395.21 |
| 2006/0059024 A1* | 3/2006 | Bailey et al. | 705/5 |
| 2006/0276208 A1* | 12/2006 | Jain | 455/466 |
| 2007/0022021 A1* | 1/2007 | Walker et al. | 705/26 |
| 2007/0133553 A1* | 6/2007 | Kahn et al. | 370/395.2 |
| 2007/0133571 A1* | 6/2007 | Kahn et al. | 370/400 |
| 2007/0233822 A1* | 10/2007 | Farmer et al. | 709/220 |
| 2008/0065761 A1* | 3/2008 | Wilson | 709/224 |
| 2008/0243996 A1* | 10/2008 | Wu et al. | 709/203 |
| 2009/0064147 A1 | 3/2009 | Beckerle | |
| 2009/0116635 A1* | 5/2009 | Erhart et al. | 379/266.01 |
| 2009/0158402 A1* | 6/2009 | Ding | 726/4 |
| 2009/0171853 A1* | 7/2009 | Georgiou et al. | 705/80 |
| 2009/0228606 A1* | 9/2009 | McCarthy et al. | 709/248 |
| 2009/0249222 A1* | 10/2009 | Schmidt et al. | 715/751 |
| 2009/0265471 A1* | 10/2009 | Li et al. | 709/227 |
| 2009/0310484 A1* | 12/2009 | Sisalem et al. | 370/230 |
| 2010/0002883 A1* | 1/2010 | Sammour et al. | 380/272 |
| 2010/0179994 A1* | 7/2010 | Bittles et al. | 709/206 |
| 2010/0191637 A1* | 7/2010 | Alderucci et al. | 705/37 |
| 2010/0223400 A1* | 9/2010 | McCarthy et al. | 709/248 |
| 2010/0254265 A1* | 10/2010 | Kempe | 370/237 |
| 2010/0262717 A1* | 10/2010 | Critchley et al. | 709/251 |
| 2010/0323667 A1* | 12/2010 | Oschwald et al. | 455/412.2 |
| 2010/0332376 A1* | 12/2010 | Vasiliu et al. | 705/37 |
| 2010/0332975 A1* | 12/2010 | Chang et al. | 715/256 |
| 2010/0333019 A1* | 12/2010 | Oschwald et al. | 715/810 |
| 2011/0126290 A1* | 5/2011 | Krishnamurthy et al. | 726/26 |
| 2012/0123922 A1* | 5/2012 | Nicolaidis et al. | 705/35 |
| 2012/0123923 A1* | 5/2012 | Nicolaidis et al. | 705/35 |

OTHER PUBLICATIONS

Park et al., "Data Throttling for Data-Intensive Workflows," Proceedings of 2008 International Parallel and Distributed Processing Symposium (IPDPS 2008), Miami, FL, Apr. 14-18, 2008, http://www.cs.virginia.edu/~humphrey/papers/Park_Data_Throttling_IPDPS2008.pdf.

Pramati, "Pramati Enterprise Appserver 6.0," Oct. 2010, http://middleware.pramati.com/docstore/Datasheet-Pramati%20Enterprise%20Appserver%206%20v2.pdf.

Laksberg, "Dataflow Programming with Maestro," MSDN Blogs, Feb. 2009, http://blogs.msdn.com/b/maestroteam/archive/2009/02/27/dataflow-programming-with-maestro.aspx.

Oracle, "Configuring WebLogic JMS Clustering," Oct. 2010, http://download.oracle.com/docs/cd/E12840_01/wls/docs103/jms_admin/advance_config.html.

* cited by examiner

NON-GREEDY CONSUMPTION BY EXECUTION BLOCKS IN DATAFLOW NETWORKS

BACKGROUND

Background and Relevant Art

Computers and computing systems have affected nearly every aspect of modern living. Computers are generally involved in work, recreation, healthcare, transportation, entertainment, household management, etc.

In a dataflow network, data propagates from one node to another. However, if it propagates without any throttling, the target node may become overwhelmed with the incoming data it is processing, or alternatively, the target node may consume the data prior to needing it, preventing another target node from potentially consuming it. Such throttling maybe achieved with blocking, where the source node nodes wait for availability in the target node. However this may occupy underlying processors or threads. This may lead to non-scalable systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is a method practiced in a computing environment. The method includes acts for processing messages. The method includes at a first entity receiving from a second entity a first offer of a first message to process. The method further includes determining to not process the first message. As a result of determining to not process the first message, such an indication is made to the second entity. Further as a result of determining to not process the first message, an indication is stored that the second entity offered a message. The indication includes an indicator correlated to the second entity. Subsequent to indicating to the second entity, using the indication the method includes indicating to the second entity availability to process a message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may implement non-greedy consumption by execution nodes in a dataflow network. Data may be consumed by target execution nodes (referred to herein also as target nodes) when the target nodes are ready to process the data. In some embodiments, execution nodes in a dataflow network maintain both an input queue and a collection of indicators of postponed messages previously offered to them and/or of nodes that previously offered the messages. If currently busy processing a sufficient quantity of previously submitted messages, if the input buffer is sufficiently full, the node needs something from another entity to process the message, and/or for other reasons, the execution node may choose to postpone the newly offered messages until such time that more messages are needed for processing. At that point, it may call back to the source to ask for a message to be processed. For example, it may call back for the latest message available. In an alternative embodiment it may call back for the specific message postponed. In the following description, nodes may be illustrated specifically as blocks as explained in more detail below.

Figure 1:
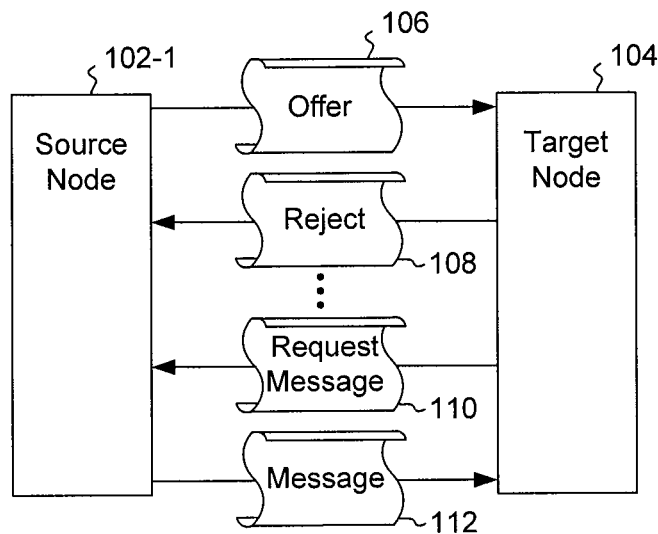
FIG. 1 illustrates a block diagram including communications between a source node and a target node.

Referring now to FIG. 1, a basic example is shown. In the Example shown in FIG. 1, a source node 102-1, which may be a computing entity, sends an offer 106 to a target node 104. The offer 106 may be an offer of some data or some message that has been processed by the source node 102-1 and needs further processing by the target node 104 or some other node. The offer 106 may be implemented in any one of a number of different fashions. For example in some embodiments, the offer may include an actual message to be processed, which the target node 104 can either accept and process, or reject. As described below, a rejection may be one or more of a number of different responses. For example, a rejection may be a postponement or an outright and final rejection. These will be described in more detail below. In an alternative embodiment, the offer may be an invitation for the target node 104 to retrieve a message to be processed along with some indication indicating to the target node 104 where the message to be processed may be found. For example, the offer 106 may include a URI indicating where a message to be processed can be retrieved from.

FIG. 1 further illustrates that the target node 104 sends the source node 102-1 a rejection 108. The rejection 108 indicates that the target node 104 is refusing the offer and will not process the message or add the message to the target node's queue. The source node 102-1, with this information, can make other arrangements for processing of the message or not cause the message to be processed. But in any case, the source node 102-1 knows not to wait on the target node 104 to process the message. In some embodiments, this provides resource efficiencies in that an underlying thread or processor will not need to be used to wait for the target node 104 to become available.

As a result of, or part of the target node 104 rejecting the offer 106, the target node can store information about or related to the offer. For example, the target node 104 can store an indicator identifying the message offered by the source node 102. As will be illustrated later, this information can be used by the target node 104 to later ask for the exact same message previously offered in the offer 106. However, it should be noted that in some embodiments, this information may not be stored and/or used, such as when the target node 104 later simply asks for any message from the source node. Other information that may be stored by the target node 104 includes information identifying the source node 102-1 as a node for which an offer was rejected. This can be used by the target node 104 to later ask for the message previously offered, or other messages that the source node 102-1 has to offer. Various embodiments will be illustrated in more detail below.

Referring once again to FIG. 1, FIG. 1 illustrates that the target node 104 sends the source node 102-1 a request message 110. The request message 110 is an indicator from the target node 104 to the source node 102-1 that the target node 104 is now ready to process messages from the source node 102-1. This may be due to the target node 104 having freed up and now having available processing resources by having processed messages that were previously being processed by the target node 104. As will be illustrated in more detail below, available processing resources may be based on a concurrency capacity and/or a buffer or queue capacity.

Referring once again to FIG. 1, a message 112 is sent from the source node 102-1 to the target node 104. The message 112 may be, in some embodiments, the message that was offered in the offer 106. However, as noted above and as will be shown in more detail below, the message 112 may be a different message than the source node 102-1 has available for processing. The message 112 may then be processed by the target node 104, placed in a queue at the target node 104 for later processing, or some other action may be performed.

Figure 2:
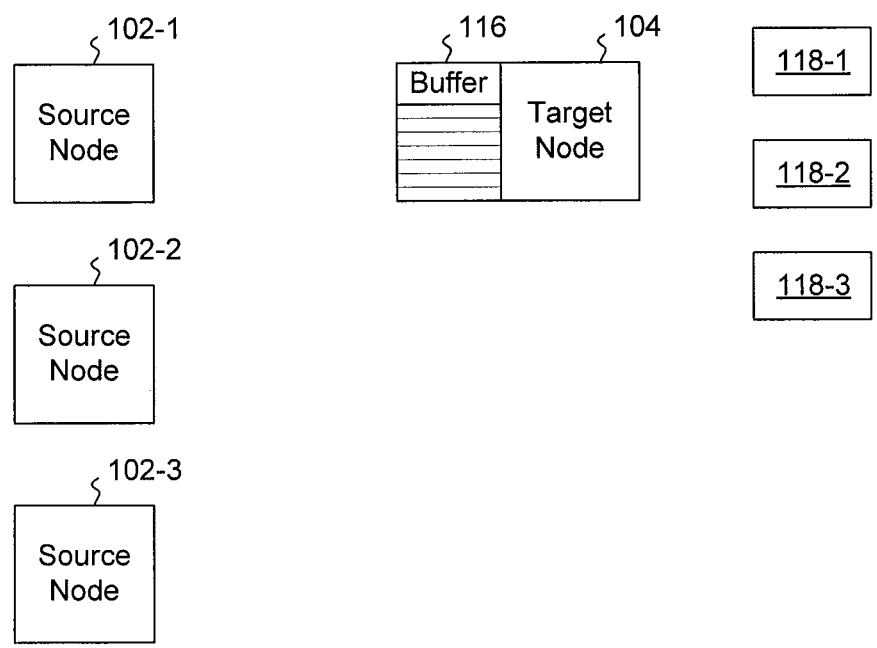
FIG. 2 illustrates a block diagram including an illustration of a plurality of target nodes, a target node with a buffer and underlying processing threads.

Referring now to FIG. 2, an embodiment is illustrated where the target node 104 includes capabilities for accepting a plurality of messages for processing. This may be due to the target node 104 having buffer capabilities and/or the target node having concurrency capabilities that allow for multiple messages to be processed concurrently.

Illustrating now buffering, attention is directed to FIG. 2. FIG. 2 illustrates that the target node 104 includes, or has associated with it a buffer 116. The buffer 116 can store messages for processing by the target node 104. In the particular example shown, the buffer 116 is capable of storing six messages for later processing. This example is only illustrative and different sized and/or dynamically sized buffers may be alternatively or additionally used. The target node may accept messages for processing or send request messages, such as request message 110 based on available capacity in the buffer.

FIG. 2 further illustrates concurrency of the target node 104. In particular, the target node 104 may be capable of concurrently performing a plurality of operations (referred to herein generally as 118, but shown specifically in FIGS. 2 as 118-1, 118-2, and 118-3). In the illustrated example, each operation 118 may be capable of processing a message. Thus in the example illustrated in Figure 2, the target node 104 can handle nine messages at any given time, three can be processed by the operations 118 and six can be stored in the buffer 116.

In the example illustrated in FIG. 2, offers, such as the offer 106 may be sent from one or more of a number of different source nodes, illustrated as 102-1, 102-2, and 102-3. While three nodes are illustrated, it should be appreciated that any number of source nodes may be used. Additionally, in some embodiments any given source node can send more than one offer in spite of the fact that the target node 104 has previously rejected an offer 106.

As noted above, the target node 104 can reject offers 106. As part of rejecting or associated with rejecting, the target node 104 can store information about a source node from which an offer was rejected. As noted, some embodiments may be implemented where the target node can also store information about specific messages associated with offers. Embodiments may be implemented where the target node 104 can store information about multiple source nodes and/or multiple messages.

For example, each of the source nodes 102-1, 102-2, and 102-3 may send an offer, similar to offer 106, to the target node 104. The target node may send each of the source nodes 102-1, 102-2 and 102-3 a rejection, such as the rejection 108. The target node 104 may also store information about the source nodes 102-1, 102-2. and 102-3. The target node may then determine that it has capacity to handle multiple messages, using the buffer 116 and/or the concurrency ability to process multiple operations 118, and thus may use the information about the source nodes 102-1, 102-2 and 102-3 to send request messages, such as request message 110 (illustrated in FIG. 1) to each of the source nodes 102-1, 102-2 and 102-3.

Additionally or alternatively, an individual source node 102 may have sent multiple offer messages, such as offer message 106, to the target node 104. The target node 104, when it has determined that it has capability to handle a plurality of messages and using the stored information about source nodes and/or messages, may send one or more requests, such as request 110, to the source node requesting some or all of the messages associated with previously sent offers. In some embodiments, the target node 104 may also only store one message from the source, overwriting any information about previously offered messages.

While in the examples shown above the target node 104 is illustrated as sending a rejection 108 in response to an offer 106, it should be appreciated that in some embodiments the target node 104 has other optional messages that can be sent. For example, though not shown, when the target node 104 receives an offer 106, the target node may respond with a message indicating that the offer 106 was received and that the target node 104 is accepting the message identified in the target for processing. Alternatively, the target node 104 may send a message rejecting the offer and indicating that it will never process the message identified in the offer 106. Alternatively, the target node 104 may send a message rejecting the offer 106, but indicating that the target node 104 may at some time send a request 110 for the message identified by the offer 106 or some other message that can be provided by the source node 102.

The source node 102 can then take varying actions based on the response provided by the target node 104. For example, if the source node 102 receives a rejection which indicates that the target node 104 will never process a message identified in an offer 106, then the source node 102 knows that it will need to find other nodes to process the message identified in the offer 106. Alternatively, if the target node 104 receives a rejection which indicates that the target node 104 may return at some point with a request 110, the source node 102 may delay finding another node to process the message identified in the offer 106.

The embodiments described above, as illustrated, may exhibit one or more of a number of different functionalities. For example, embodiments may exhibit functionality for automatic retrieval of messages as processing resources become available. Embodiments may exhibit functionality for dynamic partitioning in a dataflow network through consumer-driven load-balancing. Embodiments may exhibit functionality for tracking postponed messages and the sources that offered them to enable retrieval of a specific message or retrieval of the latest message available. Embodiments may exhibit functionality for parallel processing of postponed messages.

A coded example is now illustrated. In particular, code may be stored on computer readable media and executed by one or more processors to implement various dataflow nodes and other functionality. In the present example, a target dataflow node is represented through an interface providing the ability to notify the node when data is available. The following illustrates the definition for the target dataflow block:

```
public interface ITargetBlock<TInput>
{
    bool Post(TInput);
    DataflowMessageStatus OfferMessage(
        DataflowMessage<TInput> message, ISourceBlock<TInput> source, bool consumeToAccept);
    void DeclinePermanently( );
}
```

User code may use the Post method of a target node to get data into the node, while source nodes linked to the target propagate data to the target using the target's OfferMessage method. Nodes can be notified that they can stop accepting messages by calling DeclinePermanently( ).

In the illustrated example, OfferMessage accepts three parameters: the message being offered (the message is a wrapper around the actual data, i.e. the message payload), a reference to the source offering the message, and a Boolean flag that indicates whether the target needs to call back to the source to consume and assume ownership of the offered message. Dataflow target nodes are often "greedy", meaning that they try to accept all data posted and offered to them, regardless of what other target nodes may also be linked from the source and potentially interested in the data.

There can be many kinds of target nodes, including nodes that exist to take input data and run user code to process provided messages. For example:

```
var processor = new ActionBlock<int>(i => ProcessInteger(i));
processor.Post(1);
processor.Post(2);
```

Such nodes may also be linked to from source nodes, such that data from the source node is automatically propagated to the target, through use of OfferMessage. The following illustrates linking nodes:

```
var source = new TransformBlock<string,int>(s => ParseForInt(s));
var processor = new ActionBlock<int>(i => ProcessInteger(i));
source.LinkTo(processor);
source.Post("1");
source.Post("2");
```

In the default greedy mode, the ActionBlock<TInput> maintains an input queue to store all of the input data, and processes the data from the queue as fast as it can, subject to any control constraints put in place by the developer (e.g. the maximum number of threads to use concurrently to process messages). With an unbounded input queue, the ActionBlock will continually accept all data provided to it, buffering all of that data.

This can have a few downsides. First, it limits control over how data is buffered. For example, a developer might want the ActionBlock to process messages in priority order, such that when it goes to the buffer to get the next item, the next item is the highest priority item that's been buffered. Without making the ActionBlock itself configurable as to the queue it uses internally, that is challenging. Second, in a dataflow network where a source is linked to multiple targets and offers messages to each target in turn, such a target will prevent subsequent targets from getting any data. In the example below processor2 target will not get any data.

```
var source = new TransformBlock<string,int>(s => ParseForInt(s));
var processor1 = new ActionBlock<int>(i => ProcessInteger(i));
var processor2 = new ActionBlock<int>(i => ProcessInteger(i));
source.LinkTo(processor1);
source.LinkTo(processor2);
```

To solve both of these problems, ActionBlock (and other targets like it) may be configured to be non-greedy. When non-greedy, it does not blindly accept all messages offered to it. Rather, it only accepts messages according to a configurable policy. In the extreme, the node can be configured to only accept messages if the input queue is empty and the node is not currently processing any messages. Alternative embodiments with other policies are possible. For example, a policy may place an upper bound on the number of items that is allowed in the queue for a new message to be accepted. If the check fails and the message cannot be accepted, it gets postponed, meaning that OfferMessage returns a DataflowMessageStatus to the source indicating that ownership of the message was not assumed but that the node may desire the message in the future. In the meantime, the source is able to offer the message to other nodes. When the target returns Postponed, it also stores into an in-memory map the pair of the source and the message that was offered. This allows the target to keep track of sources that have offered it a message that has been postponed. When the target node finishes processing its current message, it checks the input queue to see if there is any data available there. If there is, it removes the next item from the queue and processes it. If there are no elements in its input queue, it then proceeds to check whether there are any pairings in its map of postponed messages. If there are, it removes one according to some policy and uses the information to call back to the relevant source. At this point the target node has several options. Various policies may be used for addressing postpones. For example, random, first-in-first-out, last-in-first-out, etc. Embodiments, may ask the source node for the exact message it was offered, done through a ConsumeMessage method on the source:

```
public interface ISourceBlock<TOutput>
{
    DataflowMessage<TOutput>
    ConsumeMessage(DataflowMessage<TOutput> message,
    ITargetBlock<TOutput> target);
    bool TryReceive(out TOutput item);
    ...
}
```

If the message is still available in the source, ConsumeMessage will transfer ownership of the message to the target, returning either the same message object or a new message object solely owned by the target. The target may then process that consumed message as if the message had come from the target's input queue. When it finishes processing that message, it repeats the process.

Instead of consuming the exact message the target was offered, the target may also ask the source for the next available message, which may or may not be the same message that was offered. In the code example illustrated above, this is done using a TryReceive method. In an alternative embodiment, this could be done by passing null as the message parameter in a simplified ISourceBlock interface listed above. Though not enumerated here, a number of different embodiments may be implemented to expose this functionality.

As Post is meant to be used directly by user code, it is not subject to the same greedy/non-greedy behaviors that govern OfferMessage. Thus, even if OfferMessage is postponing messages, message provided through Post may still be stored in the input queue, in effect taking priority over messages provided through OfferMessage.

With this non-greedy behavior, a number of benefits can be realized in some embodiments. For example, in some embodiments, a node's input queue is effectively replaced by linked sources. This allows for a source to handle messages however it sees fit. For example, a source may choose to offer messages to all linked targets and then drop the message if no target accepts the message and a new message arrives. If such a node is linked to an ActionBlock, this then allows the ActionBlock to operate in a mode where the next message it processes is always the most recent message to arrive. Illustrating another example, the source may be a priority buffer, ordering messages and offering them up according to a priority metric on those messages; a non-greedy linked ActionBlock will then consume and process messages in priority order.

As another example of a benefit that can be achieved, some embodiments can achieve simple load-balancing using an asynchronous pull-based model. If a source is connected up to multiple targets, e.g. one per core, and each of those nodes does the same processing, each node can be configured to be non-greedy. The source will offer messages to all targets, which will only consume the data when they are ready for more work. This allows the source to deliver load-balancing across a varied and dynamic number of targets. For example, in a set of dynamic targets, dataflow targets may be linked and unlinked from the source at any time.

There are many such nodes that can engage in this kind of non-greedy processing, including nodes that run an action for each message (e.g. ActionBlock<TInput>), a node that runs a function for each message and produces a single output for each message (e.g. TransformBlock<TInput,TOutput>), or a node that runs a function for each message and produces a set of outputs for each message (e.g. TransformManyBlock<TInput,TOutput>).

As illustrated in FIG. 2 above, such nodes may be configured to do their internal processing concurrently, meaning they can support a degree of parallelism greater than one, such that multiple messages may be processed in parallel. Each worker employed by the node may follow the same algorithm previously outlined, first checking the input queue for data, and then retrieving a postponed messages from a source. This means that a node is capable of retrieving postponed messages from multiple sources as well.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
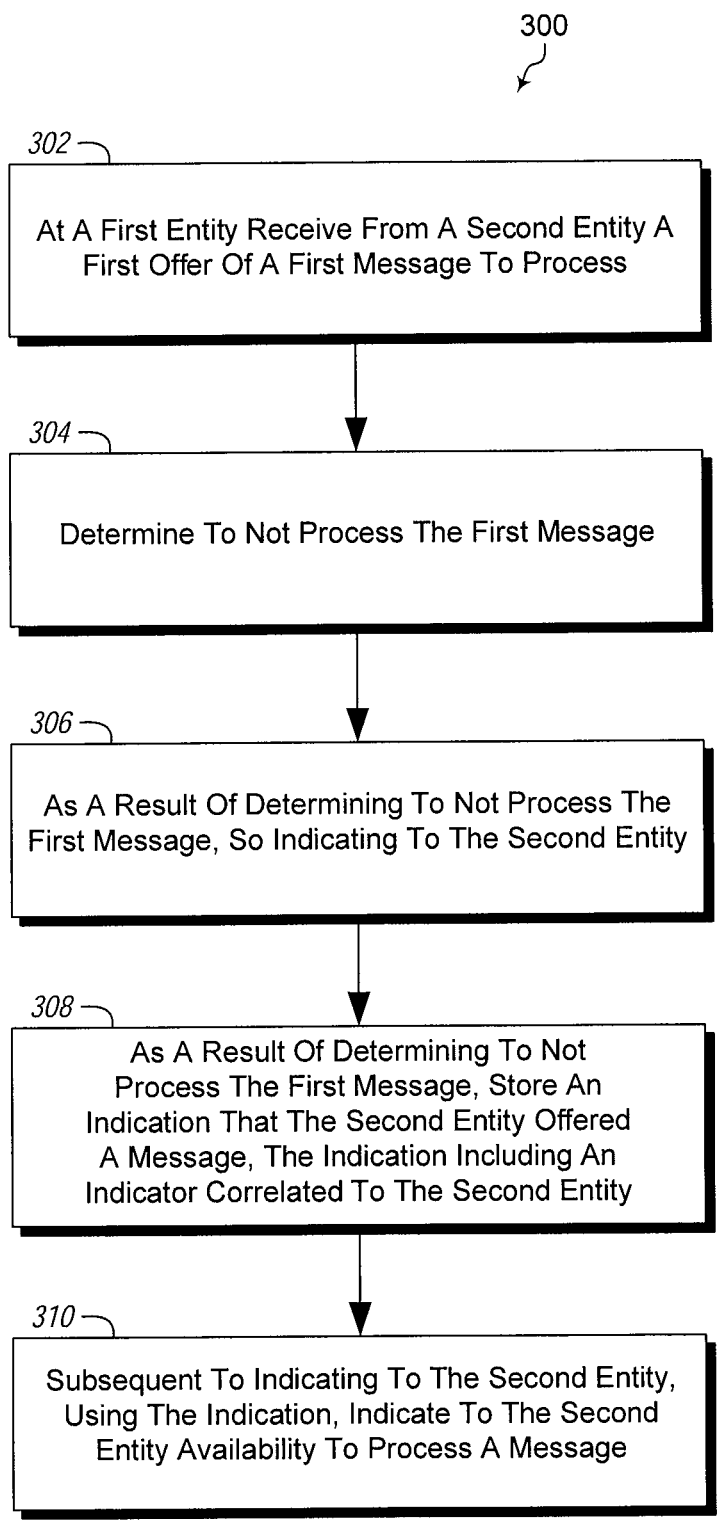
FIG. 3 illustrates a method of processing messages.

Referring now to FIG. 3, a method 300 is illustrated. The method 300 illustrates a method that may be practiced in a computing environment. The method 300 includes acts for processing messages. The method 300 includes at a first entity receiving from a second entity a first offer of a first message to process (act 302). For example, as illustrated in FIG. 1, the source node 102-1 may send an offer 106 to the target node 104. For example, in some embodiments, a second entity may send a message to the first entity, which the first entity may choose to process or may send a message back to the second entity indicating that the message will not be processed. Alternatively, the second entity can send a notification message to the first entity indicating that the first message is available for processing.

The method 300 further includes the first entity determining to not process the first message (act 304). In particular, in some embodiments, the first entity may not have processing capabilities or buffer resources open to accept the message for processing. As such, the first entity may determine not to process the first message. In the example illustrated in FIG. 1, the target node 104, may determine not to process the first message (e.g. message 112).

As a result of determining to not process the first message, the method 300 further includes so indicating to the second entity. In particular, the first entity may indicate to the second entity that the first entity will not be processing the message (act 306). As an example, FIG. 1 illustrates sending a rejection 108 from the target node 104 to the source node 102-1 indicating that the target node 104 is refusing the offer 106 and will not be processing the message.

As a result of determining to not process the first message, the method 300 further includes storing an indication that the second entity offered a message (act 308). The indication includes an indicator correlated to the second entity. For example, when the target node 104 sends a rejection 108 to the source node 102-1, the target node 104 can store information indicating that the source node 102-1 sent an offer 106 to the target node. The information may additionally include information about a particular message offered, but as illustrated below, this does not need to be included in some embodiments.

The method 300 further includes, subsequent to indicating to the second entity, using the indication, indicating to the second entity availability to process a message (act 310). For example, FIG. 2 illustrates a request message 110 being sent from the target node 104 to the source node 102-1 to indicate availability for processing messages.

The method 300 may be practiced where using the indication, indicating to the second entity availability to process a message includes indicating to the second entity the desire to process the first message. For example, the target node may send a request message 110 the specifically identifies a particular message identified in the offer 106.

In an alternative embodiment, the method 300 may be practiced where indicating to the second entity availability to process a message is performed as part of a set of indicators to a plurality of entities that had previously offered messages to the first entity, based on buffer capabilities at the first node and/or based on concurrency capabilities, and the first entity not having previously processed the messages. For example, as shown in FIG. 2, a plurality of source nodes 102-1, 102-2, and 102-3 may have sent offers to the target node 104. The target node may have previously sent rejections to each of these source nodes, but now may have room in the buffer 116 and/or availability to concurrently process operations 118. Thus, the target node 104 may send messages to a plurality of the source nodes indicating availability or requesting messages (such as message 112 illustrated in FIG. 1) for processing. A target node 104 may accept data the target can store. In particular, a target node 104 may choose to postpone processing because it has already hit its limits of what it wants to buffer. Similarly, a postponement decision can be based on both concurrency capabilities and on buffering. For example, a target 104 may choose to postpone because it is already processing a message and thus it wants to set its maximum buffer size to 0 so that it does not buffer anything while processing. Once it is done processing, the target node's maximum buffer size could be 1, so that the incoming message can be buffered while the target node 104 spins up a task to do the asynchronous processing. That task's first act will be to remove the message temporarily stored in the buffer.

In an alternative embodiment, the method 300 may be practiced where using the indication, indicating to the second entity availability to process a message includes indicating to the second entity the desire, either implicitly or explicitly, to process a last message offered from among a plurality of messages offered by second entity. For example, the source node 102-1 illustrated in FIG. 1 may have sent a number of offers 106, each corresponding to a different message 112. The target node 104, when having capacity for accepting messages, may indicate using a request message 110, to the source node 102-1 to send the message 112 associated with the most recently received offer 106.

In an alternative embodiment, the method 300 may be practiced where using the indication, indicating to the second entity availability to process a message includes indicating to the second entity the desire to process any message offered from among a plurality of messages offered by second entity. For example, in the example shown in FIG. 1, the request message 110 may be an indication, either explicitly or implicitly, that any message 112 from the source node 102-1 is acceptable. In particular, the request message 110 may include an indication that any message is acceptable. In an alternative embodiment, the request message 110, by virtue of being sent, may be an indication that any message is acceptable.

In an alternative embodiment, the method 300 may be practiced where using the indication, indicating to the second entity availability to process a message includes indicating to the second entity the desire to process a given number message offered from among a plurality of messages offered by second entity based on concurrency capabilities of the first entity. For example, the target node 104 may indicate in a single request message 110 that a given number messages can be processed. Alternatively, the target node 104 may send a given number of request messages 110, one for each message 112 that the target node 104 is capable of processing.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. Notwithstanding this definition of "network", this definition is not necessarily limiting or applicable to a "dataflow network" as described above. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method of managing dataflow from one or more source nodes in a dataflow network to one or more target nodes of the dataflow network, the computer-implemented method comprising:
    at a target node of a dataflow network, receiving from a source node of the dataflow network a first offer to send data for processing at the target node;
    said target node of the dataflow network, upon receiving the first offer, then determining in accordance with a configurable policy not to accept, said first offer so as not to process the data that the source node is offering to send to the target node;
    said target node, after determining to not accept the first offer, then sending a reject notification back to said source node indicating that the offer to have the target node process the data has not been accepted at said target node, and the target node at least temporarily storing an indication at the target node that identifies the source node which offered to send the data and/or the data that was offered to be sent for processing;
    said target node later determining in accordance with said configurable policy that it is now able to process the data previously offered by said source node and sending a request to said source node to send the data previously offered for processing; and
    said target node of the dataflow network either receiving the previously offered data, or receiving other data if the previously offered data was sent to another target node of the dataflow network.

2. The method of claim 1, wherein a plurality of source nodes send one or more offers to said target node to send data for processing at the target node.

3. The method of claim 2, wherein sending said request to send data previously offered for processing by the plurality of source nodes includes sending as a part of said request a set of indicators to said plurality of source nodes that had previously offered to send data to said target node, based on concurrency capabilities at said target node.

4. The method of claim 2, wherein sending said request to send data previously offered for processing by the plurality of source nodes includes sending as a part of said request a set of indicators to said plurality of source nodes that had previously offered to send data to said target node, based on available capacity of an input buffer at said target node.

5. The method of claim 2, wherein sending said request to send data previously offered for processing by the plurality of source nodes includes sending as a part of said request a set of indicators to said plurality of source nodes that had previously offered to send data to said target node, based on available capacity of an input buffer and concurrency capabilities of the target node.

6. The method of claim 1, wherein sending said request to send data previously offered for processing by said source node includes indicating to the source node the desire to process a last data offered to the target node from the source node, among a plurality of offers sent by said source node.

7. The method of claim 1, wherein sending said request to send data previously offered for processing by said source node includes indicating to the source node the desire to process any data offered from among a plurality of offers sent by said source node.

8. The method of claim 1, wherein sending said request to send data previously offered for processing by said source node includes indicating to the source node the desire to process given data offered from among a plurality of offers sent by said source node.

9. The method of claim 1, wherein receiving from a source node of the dataflow network a first offer to send data for processing at the target node comprises receiving the data with the offer.

10. The method of claim 1, wherein receiving from a source node of the dataflow network a first offer to send data for processing at the target node comprises receiving an indication that the data is available for processing.

11. A computer program product comprising physical storage memory containing computer executable instructions that when executed by one or more processors causes the implementation of a computer-implemented method of managing dataflow from one or more source nodes in a dataflow network to one or more target nodes of the dataflow network, and the computer-implemented method comprising:
    at a target node of a dataflow network, receiving from a source node of the dataflow network a first offer to send data for processing at the target node;
    said target node of the dataflow network, upon receiving the first offer, then determining in accordance with a configurable policy not to accept, said first offer so as not to process the data that the source node is offering to send to the target node;
    said target node, after determining not to accept the first offer, then sending a reject notification back to said source node indicating that the offer to have the target node process the data has not been accepted at said target node, and the target node at least temporarily storing an indication at the target node that identifies the source node which offered to send the data and/or the data that was offered to be sent for processing;
    said target node later determining in accordance with said configurable policy that it is now able to process the data previously offered by said source node and sending a request to said source node to send the data previously offered for processing; and
    said target node of the dataflow network either receiving the previously offered data, or receiving other data if the previously offered data was sent to another target node of the dataflow network.

12. The computer program product of claim 11, wherein a plurality of source nodes send one or more offers to said target node to send data for processing at the target node.

13. The computer program product of claim 12, wherein sending said request to send data previously offered for processing by the plurality of source nodes includes sending as a part of said request a set of indicators to said plurality of source nodes that had previously offered to send data to said target node, based on concurrency capabilities at said target node.

14. The computer program product of claim 12, wherein sending said request to send data previously offered for processing by said source node includes indicating to the source node the desire to process a last data offered to the target node from the source node, among a plurality of offers sent by said source node.

15. The computer program product of claim 12, wherein sending said request to send data previously offered for processing by said source node includes indicating to the source node the desire to process any data offered from among a plurality of offers sent by said source node.

16. The computer program product of claim 11, wherein sending said request to send data previously offered for processing by said source node includes indicating to the source node the desire to process given data offered from among a plurality of offers sent by said source node.

17. The computer program product of claim 11, wherein receiving from a source node of the dataflow network a first offer to send data for processing at the target node comprises receiving the data with the offer.

18. The computer program product of claim 11, wherein receiving from a source node of the dataflow network a first offer to send data for processing at the target node comprises receiving an indication that the data is available for processing.

19. A computer-implemented network for managing dataflow from one or more source nodes in the network to one or more target nodes of the network, the target nodes and source nodes of the network comprising a computing system comprised of:
   one or more processors;
   physical storage memory containing computer executable instructions that when executed by said one or more processors causes the implementation of a computer-implemented method of managing dataflow from one or more source nodes in the network to one or more target nodes of the network, and the computer-implemented method comprising:
      at a target node of the network, receiving from a source node of the network a first offer to send data for processing at the target node;
      said target node, upon receiving the first offer, then determining in accordance with a configurable policy not to accept, said first offer so as not to process the data that the source node is offering to send to the target node;
      said target node, after determining to not accept the first offer, then sending a reject notification back to said source node indicating that the offer to have the target node process the data has not been accepted at said target node, and the target node at least temporarily storing an indication at the target node that identifies the source node which offered to send the data and/or the data that was offered to be sent for processing;
      said target node later determining in accordance with said configurable policy that it is now able to process the data previously offered by said source node and sending a request to said source node to send the data previously offered for processing; and
      said target node either receiving the previously offered data, or receiving other data if the previously offered data was sent to another target node of the network.

20. The network of claim 19, wherein the computer-implemented method includes a plurality of source nodes sending one or more offers to said target node to send data for processing at the target node, and wherein sending said request to send data previously offered for processing by the plurality of source nodes includes sending as a part of said request a set of indicators to said plurality of source nodes that had previously offered to send data to said target node.

21. The method of claim 1, wherein the reject message is used by the source node to initiate a determination as to whether the offered data should be sent to a different target node of the dataflow network.

* * * * *